United States Patent
Diffin

(10) Patent No.: US 11,391,346 B2
(45) Date of Patent: Jul. 19, 2022

(54) POWER STEERING ASSEMBLY HAVING A SPRING RETAINER FOR A COMPENSATION MECHANISM

(71) Applicant: Steering Solutions IP Holding Corporation, Saginaw, MI (US)

(72) Inventor: Daniel J. Diffin, Freeland, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 355 days.

(21) Appl. No.: 16/655,508

(22) Filed: Oct. 17, 2019

(65) Prior Publication Data

US 2021/0116003 A1 Apr. 22, 2021

(51) Int. Cl.
| | |
|---|---|
| *F16H 1/16* | (2006.01) |
| *B62D 7/22* | (2006.01) |
| *B62D 3/04* | (2006.01) |

(52) U.S. Cl.
CPC .................. *F16H 1/16* (2013.01); *B62D 3/04* (2013.01); *B62D 7/226* (2013.01)

(58) Field of Classification Search
CPC ...... F16H 1/16; F16H 55/24; F16H 2057/126; F16H 2057/127; F16H 57/12; B62D 3/04; B62D 7/226; B62D 5/0409
See application file for complete search history.

(56) References Cited

U.S. PATENT DOCUMENTS

| | | | | |
|---|---|---|---|---|
| 9,010,483 | B2 * | 4/2015 | Kimoto | B62D 5/0409 |
| | | | | 180/444 |
| 9,382,972 | B2 * | 7/2016 | Kwon | B62D 5/0409 |
| 9,415,799 | B2 * | 8/2016 | Yoshikawa | B62D 5/04 |
| 11,073,204 | B2 * | 7/2021 | Diffin | F16H 57/12 |

FOREIGN PATENT DOCUMENTS

KR 20150028887 A * 3/2015 ............. F16H 55/24

* cited by examiner

*Primary Examiner* — Thomas C Diaz
(74) *Attorney, Agent, or Firm* — Dickinson Wright PLLC

(57) ABSTRACT

A bearing adjustment assembly is provided. The assembly includes a worm engaged with a worm gear. The assembly also includes a worm bearing located proximate an end of the worm. The assembly further includes a spring disposed in a spring bore defined by the housing. The assembly yet further includes a compensation mechanism engaging the worm bearing and the spring, the compensation mechanism being adjustable to bias the worm bearing to maintain or adjust a gear mesh load between the worm gear and the worm, wherein compression of the spring adjusts the compensation mechanism biasing of the worm bearing. The assembly also includes a spring retainer comprising a pin retainer portion disposed within an interior of the spring, the pin retainer portion extending from a main body portion of the spring retainer.

12 Claims, 3 Drawing Sheets

POWER STEERING ASSEMBLY HAVING A SPRING RETAINER FOR A COMPENSATION MECHANISM

BACKGROUND OF THE INVENTION

Vehicles may employ a power steering assist mechanism. The power steering assist mechanism provides torque assist to a steering shaft of the vehicle through a worm/worm gear reduction assembly. The worm/worm gear reduction assembly may wear over time and may influence the overall system feel and NVH performance. The wear over time reduces friction between the worm/worm gear reduction assembly and may cause poor NVH performance.

SUMMARY OF THE INVENTION

According to one aspect of the disclosure, a power steering assembly is provided. The assembly includes a housing. The assembly also includes a worm gear disposed within the housing, the worm gear being rotatable about a first axis. The assembly further includes a worm at least partially disposed in the housing, the worm being arranged to engage the worm gear and rotate about a second axis. The assembly yet further includes a floating bearing disposed proximate an end of the worm. The assembly also includes a spring disposed in a spring bore defined by the housing. The assembly further includes a compensation mechanism disposed within the housing and engaging the floating bearing, the compensation mechanism being adjustable with the spring to bias the floating bearing to maintain or adjust a gear mesh load between the worm gear and the worm. The assembly yet further includes a spring retainer in contact with the spring to maintain a position of the spring to apply a desired load on the compensation mechanism, the spring retainer being a single, integrally formed component.

According to another aspect of the disclosure, a bearing adjustment assembly is provided. The assembly includes a worm engaged with a worm gear. The assembly also includes a worm bearing located proximate an end of the worm. The assembly further includes a spring disposed in a spring bore defined by the housing. The assembly yet further includes a compensation mechanism engaging the worm bearing and the spring, the compensation mechanism being adjustable to bias the worm bearing to maintain or adjust a gear mesh load between the worm gear and the worm, wherein compression of the spring adjusts the compensation mechanism biasing of the worm bearing. The assembly also includes a spring retainer comprising a pin retainer portion disposed within an interior of the spring, the pin retainer portion extending from a main body portion of the spring retainer.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, the invention will be described with reference to specific embodiments without limiting same. It is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale, as some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
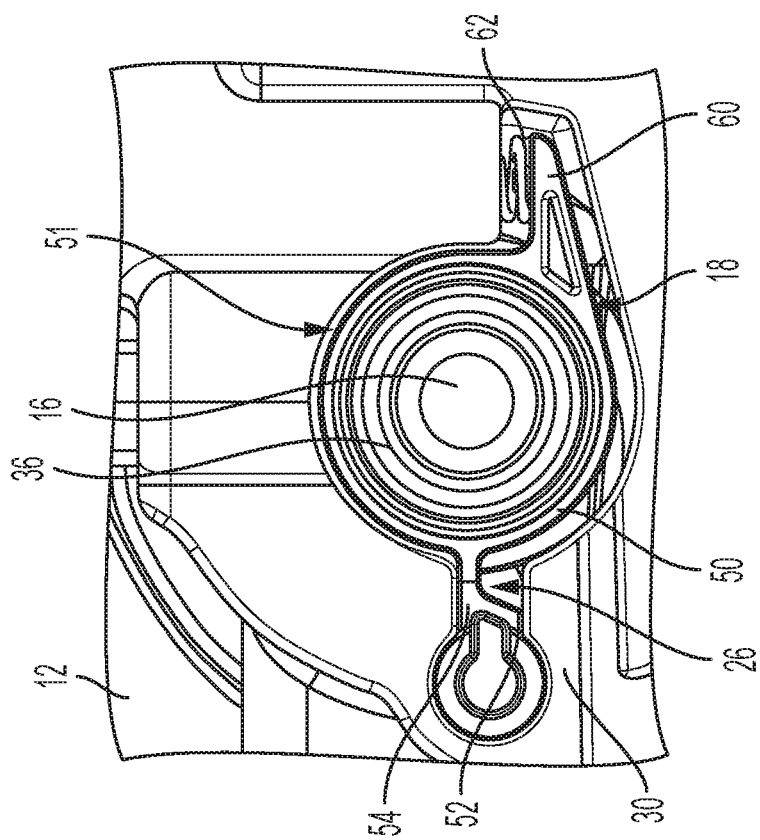
FIG. 1 is a partial cross-sectional view of a power steering assembly.

Referring to FIG. 1, a partial cross-sectional view of a power steering assembly 10 is shown. The power steering assembly 10 may be an electric power steering gearbox or the like. The power steering assembly 10 includes a housing 12, a worm gear 14, a worm 16, and a compensation mechanism 18.

The housing 12 defines a first interior cavity portion 20 that receives and houses the worm gear 14 and a portion of a first control shaft 22. At least a portion of the first control shaft 22 extends through the worm gear 14 and the housing 12 along a first axis 24. The housing 12 also defines a second interior cavity portion 26 that extends along a second axis 28 between a first end 30 and a second end 32. The first end 30 and the second end 32 may be open ends. In some embodiments, the first end 30 may be closed. The second axis 28 may be disposed transverse to the first axis 24.

The second interior cavity portion 26 receives and houses at least a portion of the worm 16. Threads of the worm 16 are arranged to engage the worm gear 14 such that rotation of the worm 16 about the second axis 28 causes rotation of the worm gear 14 and therefore rotation of the first control shaft 22 about the first axis 24. The worm 16 may be defined by at least a portion of a second control shaft 34 that extends along the second axis and extends at least partially beyond the second end 32. The second control shaft 34 may be rotatably supported by a first worm bearing 36 (also referred to herein as an outboard worm bearing 36) that is disposed proximate the first end 30 of the second interior cavity portion 26 and a second worm bearing 38 (also referred to herein as an inboard worm bearing 38) that is disposed proximate the second end 32 of the second interior cavity portion 26. The first end 32 of the second interior cavity portion 26 also defines a spring bore 40 (shown in FIG. 3). The spring bore 40 extends along a spring bore axis 42 that is disposed generally perpendicular to the second axis 28.

A third interior cavity portion 44 of the housing 12 extends from the second end 32 of the second interior cavity portion 26. The third interior cavity portion 44 may be a motor cone housing. At least a portion of the second control shaft 34 extends into and at least partially through the third interior cavity portion 44.

Figure 2:
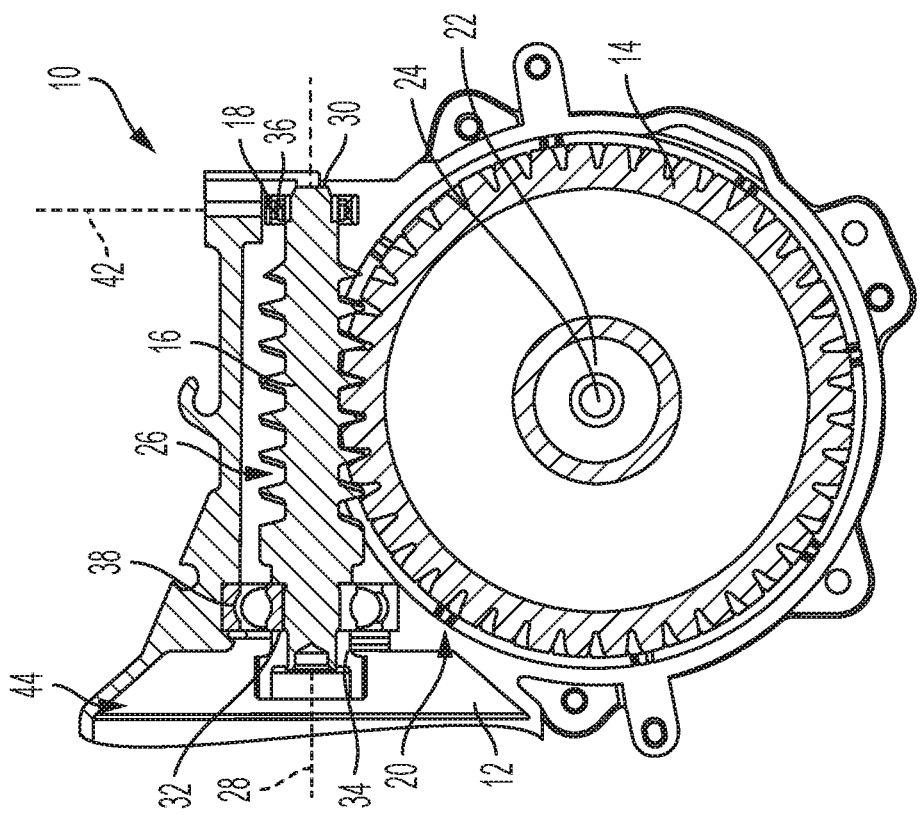
FIG. 2 is an elevational view of a compensation mechanism installed within a housing of the power steering assembly.

Referring now to FIG. 2, the compensation mechanism 18 is illustrated in greater detail. The compensation mechanism 18 is disposed proximate the first end 30 of the second interior cavity portion 26. The compensation mechanism 18 is disposed proximate the outboard worm bearing 36. The compensation mechanism 18 interfaces with the housing 12 to hold the compensation mechanism 18 in place. The compensation mechanism 18 is arranged to set initial friction to a specified target, reduce an as built friction variation and friction change over the life of the worm 16 and worm gear 14 interface within the housing 12 of the power steering assembly 10 by maintaining or adjusting (at initial build) a gear mesh load between the worm gear 14 and the worm 16. The compensation mechanism 18 may also be arranged to set friction between the worm 16 and the worm gear 14 interface to a precise initial target or a net built target, therefore reducing overall manufacturing variation.

Figure 6:
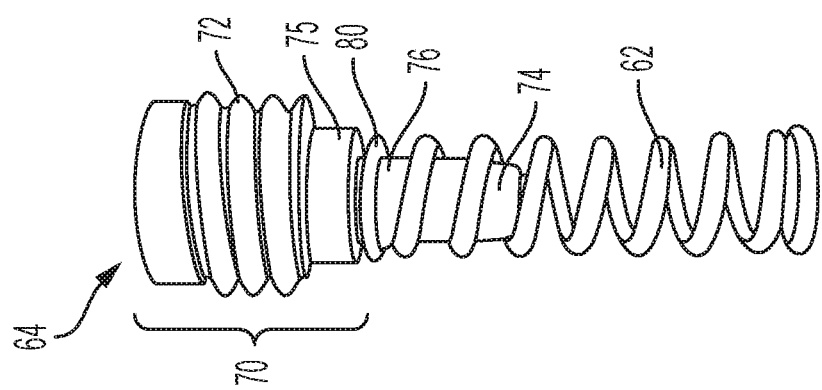
FIG. 6 is an elevational view of the spring retainer with a spring attached thereto.

The compensation mechanism 18 includes—in addition to the features shown in FIG. 6—a main body portion 50 that is substantially circular in cross section and surrounds the outboard worm bearing 36. The main body portion 50 is disposed within the second interior cavity portion 26 of the housing 12, with a controlled clearance 51 present between the outer diameter of the main body portion 50 and the housing 12. The controlled clearance 51 is a strain limiter machined into the housing 12. Extending from the main body portion 50 is an arm 52 is press fit into the housing 12. The arm 52 includes a hinge portion 54 that flexes and allows the outboard worm bearing 36 to float about—or relative to—the inboard worm bearing 38. The main body portion 50, the hinge portion 54 and the arm 52 form a single, integrally formed component.

Figure 3:
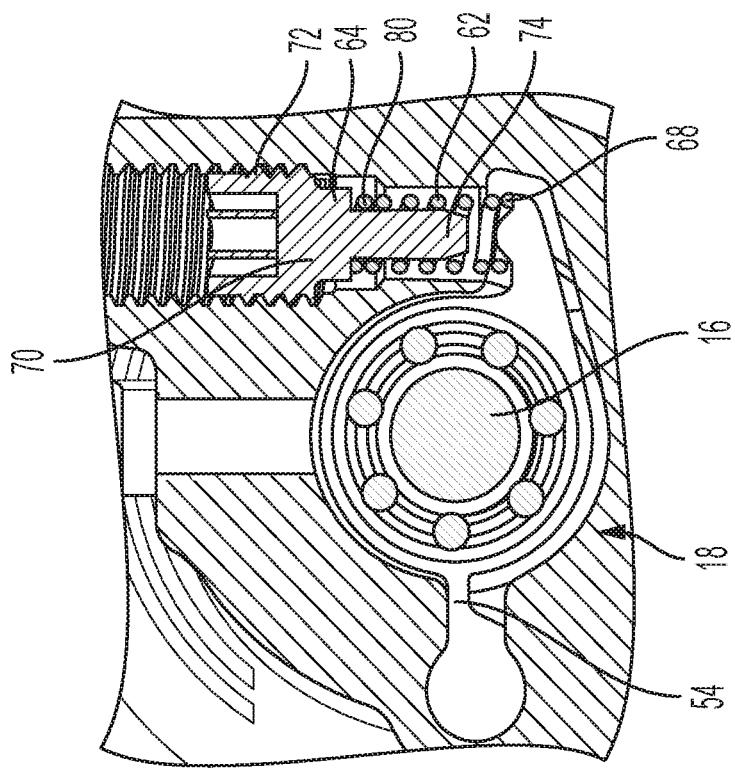
FIG. 3 is an elevational view of the compensation mechanism with a portion of the housing removed further illustrating the compensation mechanism.

Referring to FIG. 3, a portion of the housing 12 has been removed to better illustrate the spring bore 40 and a spring 62. The compensation mechanism 18 includes a spring locator and support 60 extending from the main body portion 50. The spring locator and support 60 extends far enough to be positioned proximate an end of the spring bore 40 of the housing 12. The spring bore 40 is aligned with the spring locator and support 60. A spring 62 is at least partially received by the spring bore 40 of the housing 12. The spring 62 is held or retained by the spring locator and support 60 at a first end 68 of the spring 62.

Figure 4:
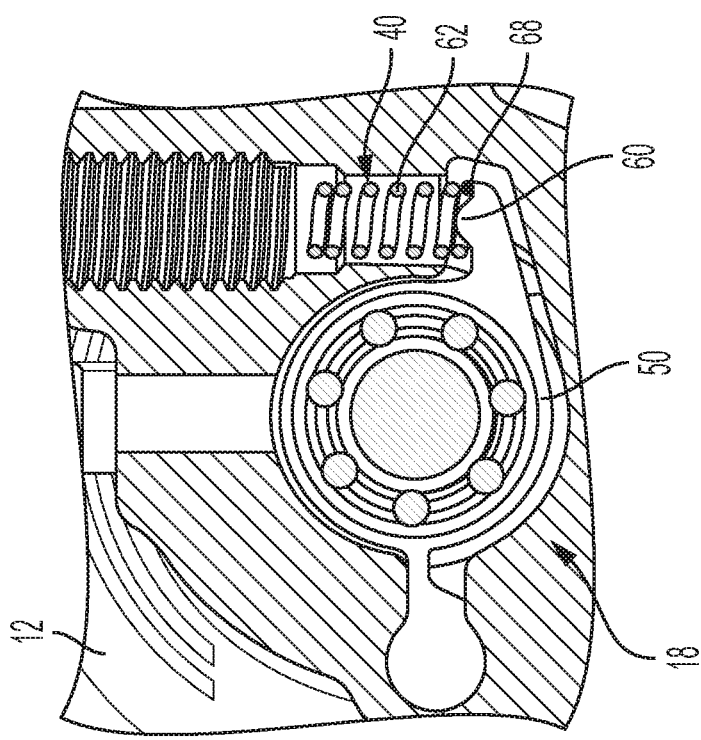
FIG. 4 is an elevational view of the compensation mechanism with a portion of the housing removed and further illustrating a spring retainer.
Figure 5:
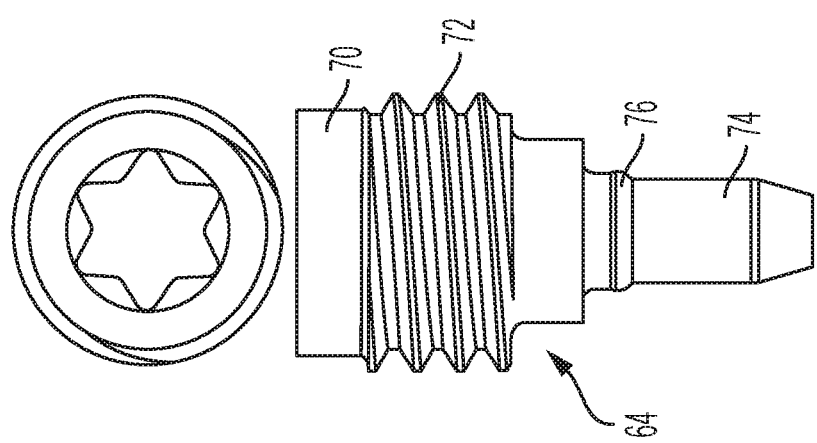
FIG. 5 is an elevational view of the spring retainer.

Referring now to FIGS. 4-6, a spring retainer 64 is illustrated for use with the spring 62. The spring retainer 64 is used to compress the spring 62, loading the worm 16 into the worm gear 14. The spring 62 and the hinge portion 54 have a low spring rate to minimize load variation into the gear mesh, compensating for worm to worm gear variations and wear over time. The consistent loading leads to lower friction variation between the worm and the worm gear to improve NVH, ride and handling performance of the power steering assembly.

The spring retainer 64 is a single, integrally formed molded component that engages the spring 62 to retain the spring 62 in a desired location and to provide controllable and consistent loading for the compensation mechanism 18. The spring retainer 64 includes a main body portion 70, with at least a portion of the main body portion 70 being a threaded region 72. The main body portion 70 of the spring retainer 64 extends axially and transitions to a pin retainer portion 74 that is smaller in cross section relative to the main body portion 70. The pin retainer portion 74 includes an annular protrusion 76 extending at least partially around the outer diameter of the pin retainer portion 74.

The pin retainer portion 74 is disposed within the interior of the spring 62 to reduce or eliminate radial movement of the spring 62, thereby preventing contact between the spring 62 and the surrounding housing 12. A second end of the spring 80 is axially secured to the spring retainer 64 by positioning at least one coil segment beyond the annular protrusion 76 of the pin retainer portion 74. Additionally, this axial retention retains the spring 62 for easy handling and assembly.

The spring retainer 64 disclosed herein addresses several issues associated with outboard worm bearing 36 being a floating bearing that is loaded by the spring 62. In particular, the spring retainer 64 provides a snap feature in the form of the annular protrusion 76 that retains the spring 62 for easy handling and assembly. The threaded region 72 of the spring retainer 64 is molded into the spring retainer 64 to facilitate easy adjustability of the spring retainer 64—and overall assembly—with a standard Torx drive. The spring retainer 64 is a single, integrally formed molded component with integrated adjustment, drive, spring retaining and spring guide features. The non-threaded portion of the main body portion 70 provides an anti-backout feature 75 based on an interference fit to the housing 12 threads. This portion 75 of the main body portion 70 also seals the threads from outside contamination in application that need sealing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A power steering assembly comprising:
   a housing;
   a worm gear disposed within the housing, the worm gear being rotatable about a first axis;
   a worm at least partially disposed in the housing, the worm being arranged to engage the worm gear and rotate about a second axis;
   a floating bearing disposed proximate an end of the worm;
   a spring disposed in a spring bore defined by the housing;
   a compensation mechanism disposed within the housing and engaging the floating bearing, the compensation mechanism being adjustable with the spring to bias the floating bearing to maintain or adjust a gear mesh load between the worm gear and the worm;
   a spring retainer in contact with the spring to maintain a position of the spring to apply a desired load on the compensation mechanism, the spring retainer being a single, integrally formed component, wherein the spring retainer includes a pin retainer portion disposed within an interior of the spring, the pin retainer portion extending from a main body portion of the spring retainer, the main body portion having a larger cross-section than the pin retainer portion; and
   an annular protrusion disposed on the pin retainer portion, wherein a portion of the spring is disposed on one side of the annular protrusion to axially retain the spring.

2. The power steering assembly of claim 1, wherein the main body portion of the spring retainer includes a threaded region that is engageable with a threading of the housing.

3. The power steering assembly of claim 1, wherein the spring bore is perpendicular to the second axis.

4. The power steering assembly of claim 1, wherein the compensation mechanism comprises a main body portion, an arm extending from the main body portion, and a spring support and locator extending from the main body portion, the main body portion surrounding at least a portion of the floating bearing, the arm engaged with the housing in a hinged manner, and the spring support and locator in contact with the spring.

5. The power steering assembly of claim 4, wherein the main body portion and the arm are a single, integrally formed component.

6. A bearing adjustment assembly comprising:
a worm engaged with a worm gear;
a worm bearing located proximate an end of the worm;
a spring disposed in a spring bore defined by a housing;
a compensation mechanism engaging the worm bearing and the spring, the compensation mechanism being adjustable to bias the worm bearing to maintain or adjust a gear mesh load between the worm gear and the worm, wherein compression of the spring adjusts the compensation mechanism biasing of the worm bearing;
a spring retainer comprising a pin retainer portion disposed within an interior of the spring, the pin retainer portion extending from a main body portion of the spring retainer; and
an annular protrusion disposed on the pin retainer portion, wherein a portion of the spring is disposed on one side of the annular protrusion to axially retain the spring.

7. The bearing adjustment assembly of claim 6, wherein the main body portion has a larger cross-section than the pin retainer portion.

8. The bearing adjustment assembly of claim 6, wherein the main body portion of the spring retainer includes a threaded region that is engageable with a threading of the housing.

9. The bearing adjustment assembly of claim 6, wherein the spring bore is perpendicular to the second axis.

10. The bearing adjustment assembly of claim 6, wherein the spring retainer is a single, integrally formed component.

11. The bearing adjustment assembly of claim 6, wherein the compensation mechanism comprises a main body portion, an arm extending from the main body portion, and a spring support and locator extending from the main body portion, the main body portion surrounding at least a portion of the worm bearing, the arm engaged with the housing in a hinged manner, and the spring support and locator in contact with the spring.

12. The bearing adjustment assembly of claim 11, wherein the main body portion and the arm are a single, integrally formed component.

* * * * *